L. E. WATERMAN.
CULTIVATOR.
APPLICATION FILED MAR. 14, 1917.

1,294,580.

Patented Feb. 18, 1919.
4 SHEETS—SHEET 1.

Inventor:
Lewis E. Waterman
By Pond & Wilson
Attys.

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

CULTIVATOR.

1,294,580.  Specification of Letters Patent.  Patented Feb. 18, 1919.

Application filed March 14, 1917. Serial No. 154,771.

*To all whom it may concern:*

Be it known that I, LEWIS E. WATERMAN, a citizen of the United States, residing at Rockford, in the county of Winnebago and State of Illinois, have invented certain new and useful Improvements in Cultivators, of which the following is a specification.

This invention relates in general to cultivators, and has more particular reference to those especially adapted for cultivating beets. It is common practice to plant rows of beets comparatively close together, and therefore, the cultivating tools of a beet cultivator must necessarily work close to the rows. It is also the general practice to cultivate four rows of plants in one operation, and as a consequence, it is necessary to provide means for steering the cultivator so that the tools may be caused to accurately follow any irregularities or deviations in the rows. Cultivators of this type are, therefore, characterized by the provision of a tool-carrying frame suspended from a main frame and being bodily laterally movable through the agency of a foot controlled steering device.

In my present invention, I have contemplated, primarily, the provision of a beet cultivator of generally improved construction embodying various novel features designed to facilitate the control, to enable better and more accurate cultivation, to allow simple and easy adjustment of the tools with respect to depth and lateral spacing, and to provide a durable and thoroughly practical cultivator of this nature which may be produced at a comparatively low cost.

In furtherance of this general object one of the features of my invention is the provision of an improved tool-carrying frame in which the tools are secured to transversely extending bars, certain of which are easily adjustable transversely by the operator to move the cultivating tools into greater or less proximity to the plants. This frame and the cultivating tools thereof are also improved in other respects as will be noted hereinafter.

Another important feature of the invention is the provision of novel means for raising and lowering the tool-carrying frame and for adjusting and maintaining the working depth of the tools. In the operation, it is desired to control these movements as easily and quickly as possible and I have, therefore, provided foot-operated means of novel design for accomplishing these objects. My improvements also provide means for automatically locking the tool-carrying frame in elevated position. These improvements enable the cultivating tools to be raised and lowered entirely by foot operation without disturbing the adjustment for the working depth of the tools, which adjustment is preferably made by means of hand levers at each side of the frame which are very conveniently accessible and allow for simple and quick independent adjustment.

Another feature of my invention resides in the provision of an improved foot steering device, by means of which the operator may very accurately and easily guide the cultivator and the tools with respect to the rows of plants.

Still another feature is the provision of an improved frame structure for cultivators of this character, including pivot wheels mounted in a novel manner on the frame, as will appear more fully hereinafter. These and other objects and attendant advantages will be appreciated by those skilled in the art as the invention becomes better understood by reference to the following description when considered in connection with the accompanying drawings, in which—

As mentioned above, cultivators of the particular type in connection with which I have embodied my improvements are characterized by a relatively long transversely extending horizontal tool-carrying frame suspended from a main wheel-supported frame and adapted to be swung laterally with respect thereto for the purpose of guiding the tools in proper relation to the rows of plants, the main supporting wheels of the frame being preferably of the pivot type and adapted to be angled in unison with lateral movement of the tool-carrying frame so that the cultivator, as a whole, may be steered. My improvements are not, however, limited to this particular type of cultivator but are generally applicable, as will be more fully appreciated hereinafter.

The tool-carrying frame spoken of is suspended from a main wheel supported frame. This latter frame may be of suitable construction, but is preferably of a three-wheel type, in which is provided two forward pivot or steering wheels and a rear caster wheel located centrally between the pivot wheels. The manner in which I have constructed the main frame is exceedingly simple and yet affords ample strength and durability. It consists of a pair of spaced rearwardly converging angle-iron side bars 12 bolted at their rear ends to a spindle bracket 13 and fixedly secured adjacent to their forward ends to a transverse angle-iron bar 14, the ends of which project beyond the side bars 12 and afford supports for the pivot wheel mountings which will be described presently. The forward ends of the side bars 12 are flattened and bent laterally as at 15, to support pendants connected to the tool-carrying frame described later. Pivotally attached at 16 to the forward ends of the side bars 12 is a tongue-carrying frame 17 formed of angle iron, as shown, and bolted at its forward end to a draft tongue 18, the rear end of which is further secured to the frame bar 17 by means of a cross-brace bar 19.

Figures 2, 6, 7, 8:
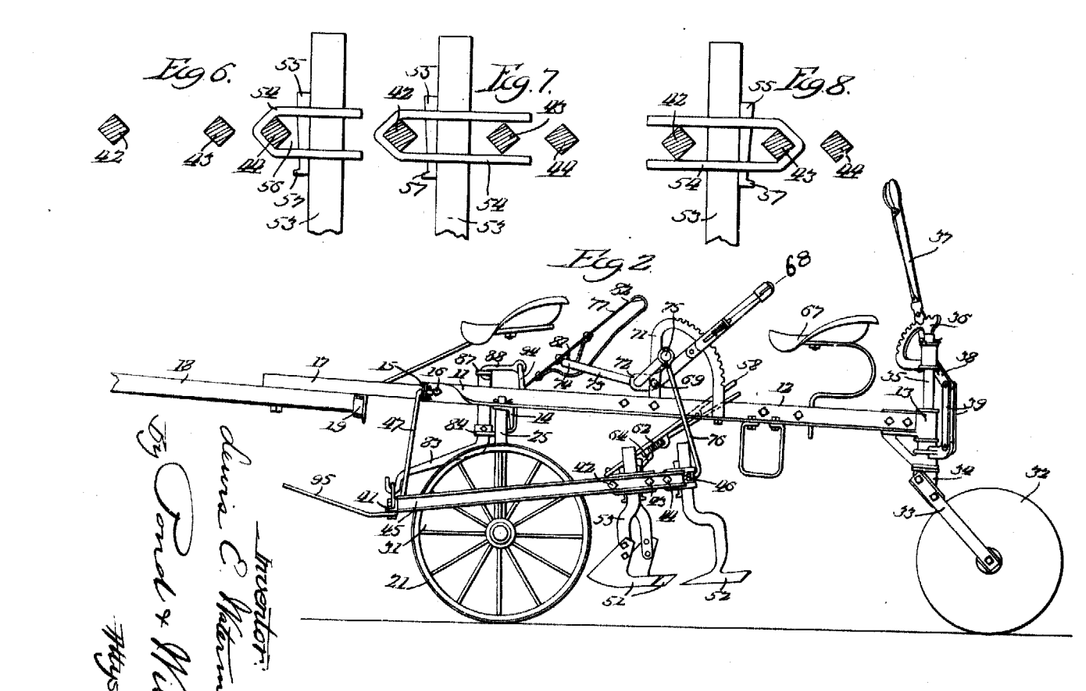
Fig. 2 is a side elevation of the cultivator showing the tool-carrying frame in elevated position.
Figs. 6, 7 and 8 are detail sectional views taken, respectively, on the lines 6—6, 7—7, and 8—8 of Fig. 1, showing the manner in which the sweep shanks are attached to the tool-carrying frame.

Concerning the supporting wheels, the pivot wheels 21 are each connected with the main frame in a similar manner and a description of one will suffice for both. It is designed to form the axle and an upright spindle or pintle about which the wheel is adapted to pivot, of a single piece, and further, to so shape this piece that it will allow the usual sand box to be mounted on the inner end of the wheel hub and the spindle to be positioned relatively close to the wheel so that the same may swing on a very short radius. In other words, the spindle will be positioned above and intermediate the ends of the axle. For this purpose, the axle piece 22 extends inwardly beyond the sand box 23, is turned upwardly and thence outwardly forming a shoulder 24, and is thence turned upwardly forming a spindle 25 or pintle, the upper end of which is reduced as at 26 and passes through one of a series of transversely spaced holes 27 in the horizontal wing of the cross bar 14. The cross bar 14 is thus seated on the pintle 25 and the parts are held against displacement by suitable means, such as a cotter pin, passed through the reduced end 26. The lower end of the pintle is suitably braced and connected to the cross bar 14 through the agency of a brace bar 28, one end of which is secured by means of bolts 29 to the vertical wing of the cross bar 14, which has transversely spaced bolt holes corresponding to the holes 27, and the opposite end is shaped to rest on the shoulder 24 and to embrace the pintle 25. The wheel spindle is thus pivotally secured to the main frame in a very simple, although substantial manner and is arranged so that its axis is disposed relatively close to the wheel which will therefore, turn about a very short radius. By reason of this construction the wheel may be very easily turned and the steering effect is almost immediate. The wheels may be adjusted transversely of the frame by setting the supports 26 and bolts 29 of the brace 28 in different holes, as will be obvious. The wheels are connected together in parallel relation so that they will be angled in unison and maintained in parallelism, this connection being established by links 31 rigidly secured at their rear ends to the axle piece and pivotally attached at their forward ends to the front transverse bar of the tool-carrying frame described hereinafter. The foot steering means will also be described later. The rear supporting wheel 32 is connected to the main frame so as to caster freely and to be vertically adjustable with respect thereto for the purpose of rocking the main frame, and consequently the tool-carrying frame, about the forward carrying wheels to thereby increase or decrease the suction of the sweeps as may be desired. The adjustable mounting of the caster wheel 32 may be of any suitable construction and in the present instance, I have shown the wheel revolubly mounted on the lower end of bars 33 rigidly secured at their upper ends to a bracket 34 in turn fixed to the lower end of a spindle 35 which is slidably and rotatably mounted in the bearing bracket 13, the lower end of which rests on the bracket 34. A notched segment 36 suitably mounted on the upper end of the spindle 35 carries a hand lever 37 adjustably coöperating with the segment in the usual manner. This lever is pivoted intermediate its ends on the segment and its lower end 38 is pivotally connected by means of links 39 to a fixed part of the frame, such as the bracket 13. The wheel 33 is thus free to caster, and by adjusting the lever 37 forwardly from the position in which it is shown in Fig. 2, the rear end of the frame may be raised with respect to the caster wheel for the purpose of increasing the suction of the sweeps or cultivating tool described later. By reason of this construction, it is possible to vary the suction independently of any other adjusting means for controlling the working position of the sweeps.

Figure 3:
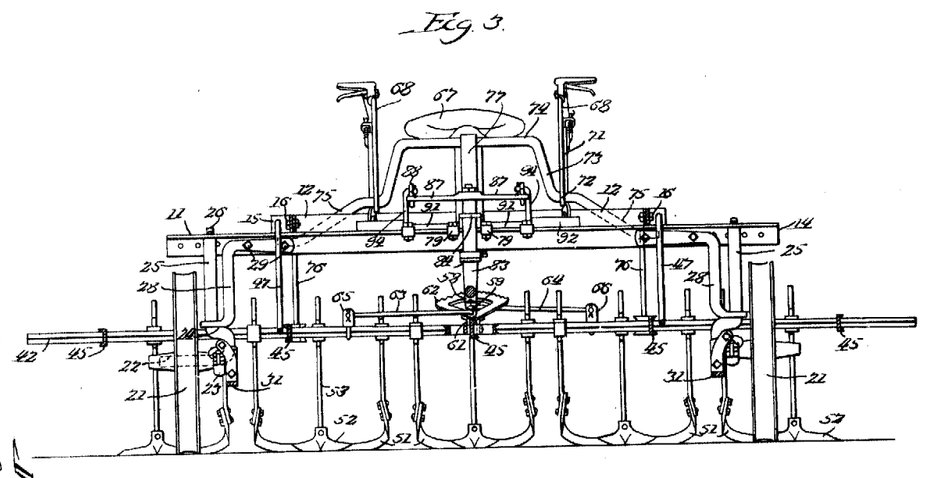
Fig. 3 is a vertical sectional view taken substantially on the line 3—3 of Fig. 1, showing the tool-carrying frame in a lowered position.

Coming now to the tool-carrying frame, this is suspended from and beneath the main frame in a manner to be capable of swinging bodily transversely with respect thereto and also to be lowered and raised with respect thereto to carry the tools into and out of working position. The frame consists of a front transverse draft bar 41, a plurality of rear transverse tool-carrying bars 42, 43, and 44 spaced apart lengthwise of the cultivator in a common plane and secured in fixed relation to the front draft bar by means of fore-and-aft bars 45, the forward ends of which are rigidly bolted to the draft bar. The tool-carrying bars are preferably square in cross-section and pass through similarly shaped apertures in the bars 45 so as to be held thereby against rotative movement about their longitudial axes and to be capable of lengthwise adjustment upon and with respect to said bars 45. The rearmost bar 44 is, however, rigidly secured to the bars 45 by means of set screws 46 passing through the rear extensions of the bars 45 and bearing against the tool-carrying bar so as to clamp the same to the bar 45. Pendants 47 pivotally mounted at their upper ends on the forward ends 15 of the main frame are pivotally attached at their lower ends 49 to the draft bar 41 of the tool-carrying frame so as to support the latter at its forward end in a manner permitting it to swing laterally, and its rear end to be swung vertically upon the ends 49 as a fulcrum. The transverse swinging movement of the frame is imparted by means of a foot-steering device described later, and the raising and lowering movement imparted to the rear end of the frame is effected by a control mechanism, also described later. The tools employed in the present instance are of a type especially adapted for cultivating beets and are in the form of single and double sweeps 51 and 52, respectively, the former of which are arranged on opposite sides of and in close proximity to each row of plants and the latter of which operate centrally intermediate the rows. The rear or double sweeps are all rigidly clamped to the rearmost tool-carrying bar 44 and the forward or single sweeps are secured alternately to the bars 42 and 43. More particularly, the forward sweeps are arranged so that all operating on one side of the rows, for instance the left-hand side, are secured to the forward bar 42 and those operating on the right-hand side of the rows are secured to the intermediate bar 43. Means are now provided for adjusting these bars 42 and 43 lengthwise in opposite directions to move each pair of sweeps into greater or less proximity to the plants to secure a finer or greater degree of cultivation or to properly position the sweeps with respect to the plants during cultivation at the different stages of growth. In this respect, my invention contemplates the mounting of sets of cultivating tools on lengthwise adjustable bars and of providing means of adjusting bars lengthwise to position the tools in proper relation to the plants being cultivated. The individual cultivating tools are also adjustably mounted on the bars so that they may be easily adjusted and secured at any longitudinal position thereon and may be raised and lowered with respect thereto as desired. The clamping means for attaching the sweeps to the supporting bars and the manner in which the sweeps are attached is best shown in Figs. 6 to 8 inclusive. Fig. 6 shows the shank of a double sweep attached to the rearmost bar 44, and Figs. 7 and 8 show the shanks of single sweeps attached respectively to the bars 42 and 43. In each instance, the shank 53 is passed through apertures in the spaced arms of a U-shaped bar-attaching piece 54 which fittingly engages a half side of one of the tool-carrying bars, and by means of a tapered key 55 passing through the opening in said arms and interposed between the shank 53 and a block 56 fitting the opposite side of the square bar, the parts 53, 54 and 56 may be rigidly clamped to the tool-carrying bar. The lowered ends of each tapered pin is provided with a lateral offset, such as 57, so as to prevent its pin from being forcibly driven upwardly out of the opening when the shank 53 is struck with a hammer or other tool for the purpose of loosening the key. By clamping the sweeps to the bars in this manner, it will be evident that it is possible to very easily secure them at any position longitudinally on the bars and to adjust the shanks vertically with respect thereto. The means for adjusting the bars 42 and 43 lengthwise consists of a hand adjusting lever 58 pivotally mounted at 59 on a bracket 61 (Fig. 3) secured to the central frame bar 45 and cooperating in the usual manner with a notched segment 62 rigidly mounted on the bracket 61, and links 63 and 64 connected at their inner ends respectively, to the lever on the front and rear sides of its pivot and at their outer ends to the tool-carrying bars 42 and 43 respectively, through the intermediary of brackets 65 and 66. It will be noted that the lever extends upwardly and rearwardly into proximity to an operator's seat 67 suitably mounted on the side bars of the main frame, so that an operator may conveniently adjust the lever at will. It will be manifest that by adjusting the lever 58 in a clockwise direction about its pivot, viewing Fig. 1, the sweeps 51 of each pair will be moved toward each other into closer proximity to the rows of plants being cultivated and upon adjusting the lever in the opposite direction the sweeps will be moved away from the rows.

Figures 4, 5:
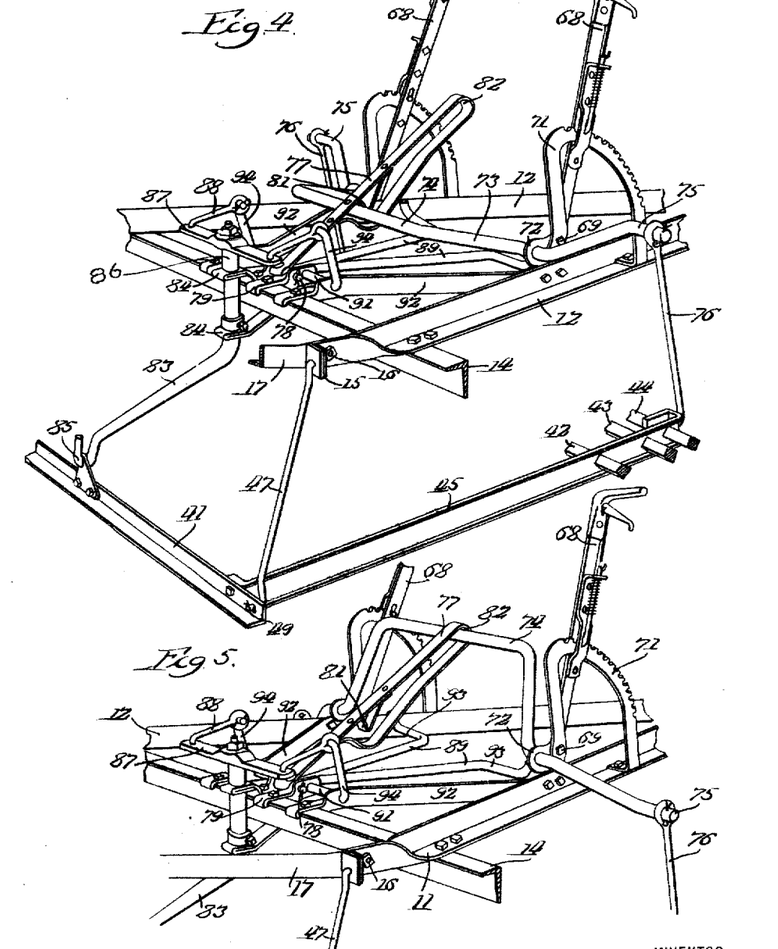
Figs. 4 and 5 are fragmentary perspective views for the purpose of better illustrating the construction of the steering device and means for raising and lowering the tool-carrying frame and showing respectively, the latter means in raised and lowered positions.

The means for raising and lowering the tool-carrying frame and for determining the working depth of the tools will now be described. In providing this means, I have contemplated a foot-operated device for raising and lowering the tools and means for automatically locking the tools in raised position upon being raised thereto, which means is foot releasable so that the entire operation is strictly by foot, and of manually adjustable means for controlling the working depth of the tools and enabling the working depth at each side of the cultivator to be varied with respect to the other, and also enabling the foot device to be operated entirely independently of the hand adjusting means, which remain in set position and are not disturbed by the operation of raising and lowering the tools. For this purpose I have provided a pair of hand-adjusting levers 68 respectively pivotally mounted on pivots 69 on notched segments 71 in turn mounted on the side bars 12 of the main frame, the levers having suitable latch engagements with the segments as is well understood in the art. Each lever is provided with a forward extension 72 in which is pivotally mounted a rocking lever, or what might be called a crank member, for raising and lowering the tools. This rocking lever is shaped to provide portions extending in opposite directions from its pivot, one portion being arranged to extend forwardly and to serve as a lever adapted to be foot-operated and an opposite portion extending in a rearward direction being connected to the tool-carrying frame so that when the foot lever is swung forwardly and downwardly the tool-carrying frame will be raised. In the present instance, this rocking lever or crank member, designated generally by reference character 73, is formed of a single rod pivotally mounted in the end 72 of the hand levers 68 and shaped intermediate the same to provide a bail shaped lever 74 and at its ends to provide cranks 75. The latter are pivotally connected by means of links 76 to the bars 45 of the tool-carrying frame located directly beneath the respective ends of the crank member. Viewing Fig. 1, it will be noted that the portions 74 and 75 of the crank member extend in opposite directions from the pivot thereof, that when the tool-carrying frame is raised the foot-lever portion 74 extends forwardly from its pivot and is disposed in substantially a horizontal plane, and that the crank portion 75 extends rearwardly from the pivot. Thus when the crank member is moved in a clockwise direction, viewing Figs. 2 and 4, the tool-carrying frame will be lowered and the foot-lever portion will be moved to substantially an upright position, as shown in Fig. 5. An operator on the seat 67 may then very easily raise the tool-carrying frame by pressing forwardly and downwardly on the lever 74 with his feet, the operation being very easily effected, since in this foot movement the strong leg muscles are employed in a very free and easy forward pushing movement. When the tools have been thus raised they will be automatically locked in elevated position by means of a latch member designated by character 77. This member is adapted to automatically engage the free end of the foot-lever portion 74 when the same has been moved to its lowermost position and will lock it in such position so as to hold the tool-carrying frame elevated. The latch member is releasable by a foot action to permit the tools to be lowered. For this purpose, I have devised a very simple and conveniently operable latch in the form of a part pivoted at 78 to a pair of cleats or brackets 79 fixed to the frame bar 14 and provided intermediate its ends with a downwardly projecting stop 81 and at its outer end with a stop 82. For the purpose of maintaining the latch in coöperative relation with the end of the lever 74, I have constructed the former to provide, in effect, a longitudinal slotway in which the end of said lever travels. Thus, in forming the latch from a piece of strap iron it is bent upon itself forming at its bend the stop 82 and is turned downwardly and forwardly beneath the stop 81 and joined at its end to the main part of the latch forwardly of said stop 81. Fig. 4 illustrates very clearly the manner in which the tool-carrying frame is locked in elevated position. To lower the tools, the operator places one foot on the end of the lever 74 at one side of the latch and with the other foot presses forwardly on the free end of the latch 77 sufficiently to disengage or raise its stop 81 from the lever 74, whereupon the latter lever will be free to swing backwardly, allowing the frame to be lowered. The tool-carrying frame will be lowered by reason of its own weight and it is even necessary to bear forwardly slightly on the lever 74 to prevent the tools from entering the ground too suddenly. During this movement, the latch rests loosely on the end of the lever 74 and the lowering movement will be limited by contact of the lever with the end 82 of the latch. It will be obvious that when the operator wishes to raise the tools he may place his feet on the lever 74 at both sides of the latch and press forwardly and downwardly until the end of the lever passes the stop 81 and the latter falls back into locking engagement with the lever. The working depth of the tools is governed by the hand levers 68. By adjusting these levers the pivotal mountings of the rocking member 73 are raised and lowered, thereby correspondingly decreasing or increasing the working depth of the tools. In the event that it is desired to adjust the working depth of the tools at one side of the frame independently of those of the opposite side, only one of the levers 68 would be adjusted. It will be especially noted that when these levers are set for a particular depth of cultivation in a given field they need not be touched thereafter until conditions require adjustment, and that the tools may be raised and lowered by foot operation at the ends of the rows when the cultivator is being turned about, independently of the means for determining the working depth. From the foregoing it will be apparent that my improvements are exceedingly practical and advantageous and while being of simple and durable construction, enable an operator to very easily and accurately control the tools with respect to the working depth, raising and lowering, and lateral spacing thereof.

Figure 1:
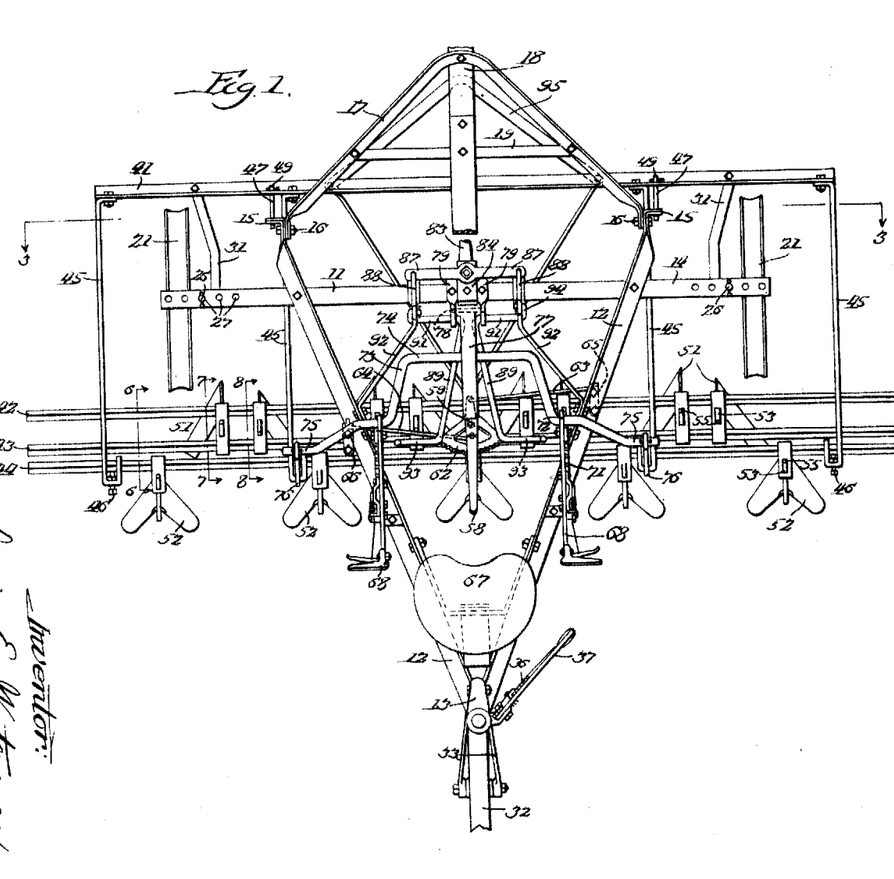
Figure 1 is a plan view of a cultivator embodying my improvements.

Coming now to the means for steering the cultivator, the construction is probably best illustrated in Figs. 1 and 4. A crank member designated generally by reference character 83, is pivotally mounted on an upright axis in brackets 84 secured to the beam 14 of the main frame and is pivotally connected at its free end at 85 to the draft bar 41 of the tool-carrying frame. A collar 86 secured to the upright portion of the crank rests on the lower bracket 84 and holds the crank member against displacement. Upon the upper end of the upright or pivot portion of the crank member is secured a cross head, the oppositely extending arms of which are pivotally connected by means of links 88 to a pair of foot levers designated generally by character 89. Each foot lever has a horizontal pivot portion 81 mounted upon and between one of the brackets 79 and an outer bracket 92 which serves as a diagonal brace between the bars 12 and 14 of the main frame. Each portion 91 of the foot lever is extended rearwardly and horizontally terminated in a foot stirrup 93 and is turned upwardly in its outer end providing an arm 94 pivotally connected to the links 88. When the operator depresses either foot stirrup 93 its arm 94 will be swung rearwardly, thereby rocking the crank member 83 and moving the tool-carrying frame bodily toward that side of the cultivator on which the depressed foot lever or stirrup is located. It will be noted that because of the leverage arrangement, that is, the relative distance between the foot stirrups and the pivot of the foot levers and between these pivots and the ends of the arms 94, very little pressure will be required to shift the tool-carrying frame and angle wheels laterally for the purpose of steering the cultivator. Thus, a very sensitive steering device is provided which enables an operator to very accurately guide the cultivator. This sensitive steering device, however, does not cause the cultivator to deviate or shift except in response to controlling movement by the operator, since by reason of the leverage arrangement and suction of the sweeps any lateral movement or strain from the tools back to the levers is quite effectually precluded.

The draft is applied to the front or draft bar 41 of the tool-carrying frame through the intermediary of a draft bar 95 secured to said bar 41 and shaped so that its forward end is extended a substantial distance above the top of the tool-carrying frame. This gives a high hitching point which serves a very useful and desirable purpose. By applying the draft to the forward end of the tool-carrying frame higher than the plane of such frame, the sweeps will be drawn into the ground by the draft and it will not be possible for them to run out of the soil during operation.

A cultivator of this character may be most advantageously operated by two operators, one for driving the horses and the other for guiding and controlling the cultivating tools. In this way each gives his exclusive attention to his particular duty and very effectual cultivation may be obtained. A front seat 95 is provided for the driver. It is possible, however, with the use of my improved foot-controlled steering and tool raising and lowering mechanism for one operator to both manage the horses and control the tools as the hands are not employed in the latter operation.

It is believed that the foregoing conveys a clear understanding of the operation and principles of my improvements and the objects prefaced above, and it should be understood that while I have illustrated a particular embodiment of these improvements in a cultivator especially adapted for cultivating beets, various modifications might be made and changes in the construction and arrangement of parts resorted to without departing from the spirit and scope of the invention as expressed in the appended claims.

I claim:

1. In a cultivator, the combination of a frame, tool-carrying means pivotally movable with respect thereto, a crank member pivotally mounted intermediate its ends on the frame and connected from one of its ends to the tool-carrying means and adapted to be foot operated at its opposite end to raise and lower said tool-carrying means, and a pivoted latch member coöperable with said crank member to limit the lowering movement of the tool-carrying means and automatically lock the crank member in elevated position when it has moved thereto.

2. In a cultivator, the combination of a frame, tool-carrying means vertically movable with respect thereto, an adjusting hand lever mounted on the frame, and a crank member pivotally mounted on the hand lever and connected to the tool-carrying means so that the crank member may be rocked to raise and lower the tool-carrying means independently of movement of the hand lever, the hand lever being adjustable to raise and lower the pivot of the crank member to thereby vary the working depth of the tools.

3. The combination of a frame, tool-carrying means vertically movable with respect thereto, a pair of adjusting hand levers transversely spaced apart on the frame, a crank member pivotally mounted on said hand levers on horizontal axes and providing a lever portion intermediate the hand levers and crank portions at the outer sides of said hand levers, a connection between each of the outer crank portions and the tool-carrying means whereby the hand levers may be independently adjusted to vary the working depth of the tool-carrying means at each side of the frame, the intermediate lever portion of the crank member being foot operable to raise and lower the tool-carrying means.

4. The combination of a frame, tool-carrying means vertically movable with respect thereto, a pair of adjusting hand levers transversely spaced apart on the frame, a crank member pivotally mounted on said hand levers on horizontal axes and providing a lever portion intermediate the hand levers and crank portions at the outer sides of said hand levers, a connection between each of the outer crank portions and the tool-carrying means whereby the latter may be raised by operation of said intermediate lever portion and whereby also the hand levers may be independently adjusted to vary the working depth of the tool-carrying means at each side of the frame, and a pivoted latch member coöperating with the lever portion of the crank member for limiting the raising and lowering movement thereof.

5. The combination of a frame, tool-carrying means vertically movable with respect thereto, a pair of adjusting hand levers transversely spaced apart on the frame, a crank member pivotally mounted on said hand levers on horizontal axes and providing a lever portion intermediate the hand levers and crank portions at the outer sides of said hand levers, a connection between each of the outer crank portions and the tool-carrying means whereby the hand levers may be independently adjusted to vary the working depth of the tool-carrying means at each side of the frame, and a pivoted latch member constantly urged into coöperative engagement with the lever portion of the crank member and provided with longitudinally spaced stops for limiting the swinging movement of the crank member to determine respectively the raised and lowered positions of the tool-carrying means.

6. The combination of a frame, tool-carrying means vertically movable with respect thereto, a pair of transversely spaced adjusting hand levers mounted on the frame, a crank member pivoted on said hand levers, which latter are independently adjustable to raise and lower the adjacent pivots of the crank member, connections between the tool-carrying means and the crank member at transversely spaced points thereon so that the working depth of the tool-carrying means at each side of the frame may be independently varied by adjustment of said hand levers, the crank portion intermediate the levers being foot-operable to raise and lower the tool-carrying means at both sides of the frame in unison.

7. In a cultivator, the combination of a main frame, a tool-carrying frame extending transversely of the main frame and mounted thereon with capacity for vertical movement with respect thereto, foot operated means connected with the tool-carrying frame at separate points at both sides of the medial line thereof and operable to raise and lower the tool-carrying frame as a unit, and manually operable levers coöperating with the foot operable means to raise and lower the same independent thereof so that the working depth of the tools may be independently adjusted at each side of the frame.

8. The combination of a frame tool-carrying means vertically movable with respect thereto, an adjusting lever at each side of the medial line of the frame, foot operable means mounted upon the adjusting levers and connected at each side of said medial line with the tool-carrying means at the adjacent side and being operable to raise and lower said tool-carrying means at both sides of the frame in unison, the levers being independently adjustable to vary the working depth of the tools at each side of the frame through the intermediary of said foot operable means.

9. The combination of a frame, tool-carrying means vertically movable with respect thereto, a crank member pivotally mounted on the frame on opposite sides of the medial line thereof and having its intermediate portion extending in a forward direction from its pivots, the crank member having arms adjacent to each of its pivots extending in an opposite direction from said intermediate portion, a connection between each of said arms and the tool-carrying means at the adjacent side of the frame so that when said intermediate crank portion is swung downwardly and forwardly the tool-carrying means will be raised, and stops for limiting the movement of the crank member in opposite directions to thereby limit the raising and lowering positions of the tool-carrying means.

10. The combination of a frame, tool-carrying means vertically movable with respect thereto, a crank member pivotally mounted on the frame on opposite sides of the medial line thereof and having its intermediate portion extending in a forward direction from its pivots, the crank member having arms adjacent to each of its pivots extending in an opposite direction from said intermediate portion, a connection between each of said arms and the tool-carrying means at the adjacent side of the frame so that when said intermediate crank portion is swung downwardly and forwardly the tool-carrying means will be raised, and a pivoted member coöperating with the free end of said intermediate portion of the crank member and provided with longitudinally spaced stops with which said free end of the crank member is engageable and by means of which the raised and lowered positions of the crank members are limited.

11. The combination of a frame, tool-carrying means vertically movable with respect thereto, a crank member pivotally mounted on the frame on opposite sides of the medial line thereof and having its intermediate portion extending in a forward direction from its pivots, a connection between the crank member and the tool-carrying means for raising and lowering the latter by the former, and a pivoted latch member having its free end coöperating with the free end of the crank member and extending longitudinally of the frame in a downwardly and forwardly inclined direction and having longitudinally spaced stops for limiting the swinging movement of the crank member in raised and lowered positions, the forward stop which serves to hold the crank in lowered position being automatically engageable with the crank member upon movement thereof to such position and being releasable from said engagement by swinging the latch member upwardly about its pivot.

12. The combination of a frame, tool-carrying means vertically movable with respect thereto, a pair of transversely spaced adjusting levers mounted on the frame, a crank member pivotally mounted on said levers so that its pivot portions may be independently raised and lowered by adjustment of said levers, the crank member having end portions extending from its pivots in a rearward direction, a connection between each end crank portion and the adjacent side of the tool-carrying means, the portion of the crank member intermediate its pivots being extended therefrom in a forward direction and being foot operable to raise and lower the tool-carrying means, and means coöperable with said intermediate portion of the crank member to determine the raised and lowered positions of the tool-carrying means, the hand levers being independently adjustable to vary the working depth of the tool at each side of the frame.

13. The combination of a frame, tool-carrying means movable vertically with respect thereto, a rocking lever mounted at spaced points on the frame on opposite sides of the medial line thereof and connected to the tool-carrying means on opposite sides of said medial line, means for limiting the movement of the rocking member in a tool-lowering direction so as to limit the working depth of the tools, and means for vertically adjusting the pivot points of said rocking member with respect to the frame so as to vary the working depth of the tools independently of said depth limiting means.

14. In a cultivator, the combination of a main frame, a tool-carrying frame suspended beneath and movable bodily, transversely with respect to the main frame, a crank member pivoted on the main frame on an upright axis and connected at its free end with the tool-carrying frame so that upon rocking the crank member the tool-carrying frame will be moved transversely, the pivot end of the crank member having mounted thereon a pair of rigid arms extending laterally therefrom in opposite directions, and a pair of laterally spaced foot levers pivoted on the frame on horizontal axes and each connected respectively with one of said lateral arms of the crank member and being extended rearwardly from their pivots and terminating in foot stirrups so that upon depressing one of the latter the tool-carrying frame will be swung horizontally toward the side of the depressed foot stirrup.

15. In a cultivator, the combination of a main wheel-supported frame, a tool-carrying frame suspended below the main frame and capable of being raised and lowered with respect thereto, a crank member pivotally mounted on horizontal axes at transversely spaced points on the main frame and shaped intermediate its pivots to provide a bail and at the outer side of each pivot a crank arm, and a connection between each crank arm and the tool-carrying frame, said intermediate bail portion of the crank member being arranged so as to be foot operable for raising the tool-carrying frame through the agency of said end crank portions.

16. In a cultivator, the combination of a main wheel-supported frame, a tool-carrying frame suspended below the main frame and capable of being raised and lowered with respect thereto, a crank member pivotally mounted on horizontal axes at transversely spaced points on the main frame and shaped intermediate its pivots to provide a bail and at the outer sides of each pivot a crank arm, a connection between each crank arm and the tool-carrying frame, said intermediate bail portion of the crank member being arranged so as to be foot operable for raising the tool-carrying frame through the agency of said end crank portions, and stops with which said bail portion is coöperable for holding the crank member in position with the tool-carrying frame raised and for limiting the working depth of said tool-carrying frame.

LEWIS E. WATERMAN.

Copies of this patent may be obtained for five cents each, by addressing the "Commissioner of Patents, Washington, D. C."